United States Patent
Maslov et al.

(10) Patent No.: US 6,727,630 B1
(45) Date of Patent: Apr. 27, 2004

(54) ROTARY PERMANENT MAGNET ELECTRIC MOTOR WITH VARYING AIR GAP BETWEEN INTERFACING STATOR AND ROTOR ELEMENTS

(75) Inventors: Boris A. Maslov, Reston, VA (US); Zareh Soghomonian, Sterling, VA (US)

(73) Assignee: Wavecrest Laboratories, LLC., Dulles, VA (US)

( * ) Notice: Subject to any disclaimer, the term of this patent is extended or adjusted under 35 U.S.C. 154(b) by 0 days.

(21) Appl. No.: 10/207,848

(22) Filed: Jul. 31, 2002

(51) Int. Cl.[7] .............................................. H02K 29/02
(52) U.S. Cl. ........................ 310/254; 310/257; 310/259; 310/156.01; 310/156.46
(58) Field of Search ....................... 310/156.01–156.03, 310/156.22, 156.25–156.26, 156.32–156.33, 156.36–156.38, 156.46–156.49, 156.51–156.52, 156.55, 254, 257–259, 216–218, 156.07, 156.12–156.15, 156.44, 156.54, 156.59

(56) References Cited

U.S. PATENT DOCUMENTS

| | | | |
|---|---|---|---|
| 3,344,325 A | * 9/1967 | Skalaroff | 318/696 |
| 4,315,171 A | * 2/1982 | Schaeffer | 310/49 R |
| 4,719,382 A | * 1/1988 | Listing | 310/187 |
| 4,786,834 A | 11/1988 | Grant et al. | 310/168 |
| 4,864,176 A | 9/1989 | Miller et al. | 310/168 |
| 5,041,749 A | * 8/1991 | Gaser et al. | 310/156.22 |
| 5,095,238 A | * 3/1992 | Suzuki et al. | 310/156.46 |
| 6,081,058 A | * 6/2000 | Suzuki et al. | 310/156.45 |
| 6,181,035 B1 | 1/2001 | Acquaviva | 310/156.16 |
| 6,329,736 B1 | * 12/2001 | Bernauer et al. | 310/254 |
| 6,384,496 B1 | * 5/2002 | Pyntikov et al. | 310/68 B |
| 6,492,756 B1 | * 12/2002 | Maslov et al. | 310/156.12 |

OTHER PUBLICATIONS

"Study of Cogging Torque in Permanent Magnet Machines", C. Studer, A. Keyhani, The Ohio State University, and T. Sebastian, S. Murthy, Saginaw Steering Systems, Delphi, Saginaw, MI, date unknown.

Technical Report, "Study of Cogging Torque in Permanent Magnet Machines", C. Studer and A. Keyhani, The Ohio University, 1998.

"Shape Optimization for Electromagnetic Devices" date unknown.

* cited by examiner

*Primary Examiner*—Dang Le
*Assistant Examiner*—Leda T. Pham
(74) *Attorney, Agent, or Firm*—McDermott, Will & Emery

(57) ABSTRACT

A permanent magnet motor is configured with selective variation of the radial distance between an interfacing pair of rotor permanent magnet and stator pole along the circumferential length of the pair. The effects of cogging torque on the overall torque signature can be controlled by setting an appropriate air gap variation profile. The stator pole and rotor magnet surfaces may be sloped with respect to each other, the angle therebetween being selected to obtain desired cogging torque compensation. Other air gap variation profiles may include provision of concave surfaces, the degree of concavity being selectable.

9 Claims, 8 Drawing Sheets

ROTARY PERMANENT MAGNET ELECTRIC MOTOR WITH VARYING AIR GAP BETWEEN INTERFACING STATOR AND ROTOR ELEMENTS

RELATED APPLICATIONS

This application contains subject matter related to copending U.S. application Ser. No. 09/571,174 of Pyntikov et al., filed May 16, 2000, copending U.S. application Ser. No. 09/826,423 of Maslov et al., filed Apr. 5, 2001, copending U.S. application Ser. No. 09/826,422 of Maslov et al., filed Apr. 5, 2001, U.S. application Ser. No. 09/966,101 of Maslov et al., filed Oct. 1, 2001, copending U.S. application Ser. No. 10/067,305 of Maslov et al., filed Feb. 7, 2002, copending U.S. application Ser. No. 10/160,257 of Maslov et al., filed Jun. 4, 2002, and copending U.S. application Ser. No. 10/160,254 of Maslov et al., filed Jun. 4, 2002, all commonly assigned with the present application. The disclosures of these applications are incorporated by reference herein.

FIELD OF THE INVENTION

The present invention relates to rotary electric motors, more particularly to a permanent magnet motor having a radial air gap of varying dimension between interfacing rotor permanent magnets and stator poles.

BACKGROUND

The above-identified copending related U.S. patent application of Maslov et al., Ser. No. 09/826,423, identifies and addresses the need for an improved motor amenable to simplified manufacture and capable of efficient and flexible operating characteristics. In a vehicle drive environment, for example, it is highly desirable to attain smooth operation over a wide speed range, while maintaining a high torque output capability at minimum power consumption. Such a vehicle motor drive should advantageously provide ready accessibility to the various structural components for replacement of parts at a minimum of inconvenience. The above-identified copending related U.S. applications describe formation of electromagnet core segments as isolated magnetically permeable structures configured in an annular ring. With such arrangements, flux can be concentrated to provide advantageous effects as compared with prior art embodiments.

As described in the above-identified Maslov et al. applications, isolation of the electromagnet core segments permits individual concentration of flux in the magnetic cores, with a minimum of flux loss or deleterious transformer interference effects from interaction with other electromagnet members. Operational advantages can be gained by configuring a single pole pair as an isolated electromagnet group. Magnetic path isolation of the individual pole pair from other pole groups eliminates a flux transformer effect on an adjacent group when the energization of the pole pair windings is switched. The lack of additional poles within the group avoids any such effects within a group. Further benefits are described from utilization of three dimensional aspects of motor structure, such as a structural configuration wherein axially aligned stator poles and axially aligned rotor magnets provide highly concentrated flux density distribution in the active air gap of the machine. Such configuration provides a greater number of poles with the same individual active air gap surface areas and/or greater total active air gap surface area than conventional motors having the same air gap diameter.

In addition to benefits of flux concentration obtainable with the configurations described above, recently introduced neodymium-iron-boron (NdFeB) magnetic materials can produce larger flux densities than other permanent magnetic materials previously used in brushless machines, thus increasing torque output capacity. The use of high density producing permanent magnets in motors which comprise a great number of poles presents a concern for ameliorating undesired effects that can be introduced by cogging torque. Cogging torque is produced by magnetic attraction between the rotor mounted permanent magnets and those stator poles that are not in a selectively magnetized state. This attraction tends to move the rotor magnet to an equilibrium position opposite a stator pole to minimize the reluctance therebetween. As the rotor is driven to rotate by energization of the stator, the magnitude and direction of the cogging torque produced by magnet interaction with non-energized electromagnet segments changes periodically to oppose and, alternately, to add to the torque produced by the energized stator segments. In the absence of compensation, cogging torque can change direction in an abrupt manner with the rotation of the rotor. If cogging torque is of significant magnitude, it becomes a rotational impediment, as well as a source of mechanical vibration that is detrimental to the objectives of precision speed control and smooth operation.

As an illustration of the development of cogging torque, a motor such as disclosed in the copending application Ser. No. 09/826,422, filed Apr. 5, 2001, is considered. The disclosure of that application has been incorporated herein. FIG. 1 is an exemplary view showing rotor and stator elements. Rotor member 20 is an annular ring structure having permanent magnets 21 spaced from each other and substantially evenly distributed along cylindrical back plate 25. The permanent magnets are rotor poles that alternate in magnetic polarity along the inner periphery of the annular ring The rotor surrounds a stator member 30, the rotor and stator members being separated by an annular radial air gap. Stator 30 comprises a plurality of electromagnet core segments of uniform construction that are evenly distributed along the air gap. Each core segment comprises a generally u-shaped magnetic structure 36 that forms two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. Appropriate stator support structure, which has not been illustrated herein so that the active motor elements are more clearly visible, can be seen in the aforementioned patent application.

FIG. 2 is diagram of a partial plan layout of a motor such as illustrated in FIG. 1, with stator poles shown in relation to rotor permanent magnets 21. Stator core elements 36 each comprise a pair of poles having base portions 31 and pole shoe portions 32. The poles are integrally linked to each other by linking portion 33. Energization windings, not shown, for each pole pair may be formed in well-known manner on the pole base portions or on the linking portion.

FIG. 3 is a partial plan layout of two adjacent stator core elements 36, with pole faces 32 denominated A–D, in relation to the rotor magnets, denominated 0–5, during motor operation. The positions of the rotor magnets are depicted at (A)–(C) for three instants of time ($t_1$–$t_3$) during a period in which the rotor has moved from left to right At time $t_1$, the winding for the A–B stator pole pair is energized with current flowing in a direction to form a strong south pole at A and a strong north pole at B. The winding for the C–D stator pole pair is not energized. The position of the rotor is shown at (A). North magnet 1 and south magnet 2 overlap stator pole A. South magnet 2 and north magnet 3 overlap stator pole B. At this time magnet 3 is approaching an overlapping position with pole C. South magnet 4 is in substantial alignment with pole C and north magnet 5 is in substantial alignment with pole D. At this time motoring torque is produced by the force of attraction between south pole A and north pole magnet 1, the force of attraction between north pole B and south pole magnet 2, and the force of repulsion between north pole B and north pole magnet 3. Poles C and D have respective weak north and south magnetization caused by the attraction of magnets 4 and 5. This attraction, which seeks to maintain minimum reluctance is in opposition to motor driving torque.

At time $t_2$, the rotor has moved to the position shown at (B). The energization of the pole pair A–B windings has been commutated off. Windings of the C–D pole pair are not energized. Magnets 1 and 2 are substantially in alignment with poles A and B respectively. North magnet 3 and south magnet 4 overlap pole C. South magnet 4 and north magnet 5 overlap pole D. Poles A and B have weak south and north magnetization respectively. The stator poles C and D are influenced by both north and south rotor magnets. Pole C is in a flux path between north pole magnet 3 and south pole magnet 4. Pole D is in a flux path between south pole magnet 4 and north magnet pole 5. A cogging torque thus has developed that opposes the motor driving torque and changes in magnitude as the rotor magnets move from direct alignment with the non-energized stator poles to partial alignment At time $t_3$, the rotor has moved to the position shown at (C). Energization of the A–B pole pair windings has been reversed, causing a strong north pole at pole A and a strong south pole at B. Windings of the C–D pole pair are not energized. North magnet 1 and south magnet 2 overlap stator pole B. South magnet 0 and north magnet 1 overlap stator pole A. At this time south magnet 2 is approaching an overlapping position with pole C. North magnet 3 is in substantial alignment with pole C and south magnet 4 is in substantial alignment with pole D.

As described above, the opposing cogging torque effects motoring torque in a manner that varies with respect to rotational angular position as the rotation proceeds. The cogging torque is most pronounced at transitional points when a rotor magnet is about to face a stator pole across the air gap. An abrupt change in the cogging torque takes place as the leading edge of the generally rectangular surface of a permanent magnet approaches the parallel edge of the rectangular stator pole. Use of high energy density permanent magnet materials such as neodymium-iron-boron (NdFeB) magnetic materials, which impart large flux densities at the air gap in the vicinities of the rotor permanent magnets, heightens this effect to the extent that undesirable vibration can become noticeable. Motors having a large number of stator poles and rotor poles, such as the axially aligned rows of stator poles and rotor magnets, can produce even greater cogging torque effects. In the same manner, cogging torque is produced to a varying extent in motors having unitary stator cores.

A variety of techniques have been utilized to minimize the effects of cogging torque. Such techniques attempt to reduce the rate of reluctance change with respect to rotor position, reduce the magnetic flux in the machine, or shift poles in a unitary stator core such that the cogging torque produced by the individual poles tend to cancel one another. Electronic methods can be used to control the intensity of the electromagnetic interaction that takes place between permanent magnet and electromagnet surfaces. Such methods have disadvantages in that they involve complex control algorithms that are implemented simultaneously with motor control algorithms and tend to reduce the overall performance of the motor. Reduction of magnetic flux diminishes advantages obtained from the newer permanent magnet materials and the flux concentration techniques of the above-identified copending applications. Shifting the location of poles in a conventional unitary stator core structure poses limitations on the size, positions and number of poles, which can prevent an arrangement that provides optimal operation.

Other approaches involve modifying the construction of the machine by changing the shape of the stator poles. Prior art stator poles conventionally made of stacked laminations are not readily amenable to modification. Available lamination machining processes are limited in the ability to reshape conventional patterns, especially three-dimensionally. A substantial range of modification of such laminated structures is too complex and costly to be feasible.

The need thus exists for effective cogging compensation in motors, particularly those having high flux density magnitudes and concentrations, and do not detract from the efficient operation and control capability of the motors while providing practicability of cost and application.

Copending application Ser. No. 10/160,257 addresses this need by shaping stator pole surfaces or rotor magnet surfaces so that the stator pole surface geometric configuration and the rotor magnet surface geometric configuration are skewed with respect to each other. The effect of the skewing arrangement is to dampen the rate of change of cogging torque that is produced by the interaction between a rotor magnet and a pole of a non-energized stator electromagnet as the permanent magnet traverses its rotational path. The ability to selectively shape stator poles is made feasible through the use of core materials such as a soft magnetically permeable medium that is amenable to formation of a variety of particularized shapes. For example, core material may be manufactured from soft magnet grades of Fe, SiFe, SiFeCo, SiFeP powder material, each of which has a unique power loss, permeability and saturation level. These materials can be formed initially in any desired three dimensional configuration, thus avoiding the prospect of machining an already formed hard lamination material.

Copending application Ser. No. 10/160,254, filed Jun. 4, 2002, addresses the need described above by offsetting the effects of cogging torque produced in a plurality of axially spaced sets of rotor and stator elements. Poles of each separate axially disposed stator core are shifted or offset with respect to each other in the axial direction to cancel the effects of cogging torque without limiting the positional relationships among the stator poles in the circumferential direction. Alternatively, rotor permanent magnets, which are arrayed in the circumferential and axial directions are offset with respect to each other in the axial direction to cancel the effects of cogging torque without limiting the total number of permanent magnets or their positions in the circumferential direction.

Minimization of torque ripple and cogging torque effects without detrimentally affecting torque output capability continues to be an important objective.

DISCLOSURE OF THE INVENTION

The present invention fulfills this need, at least in part, by selective variation of the radial distance between an interfacing pair of rotor permanent magnet and stator pole along the circumferential length of the pair. The motor rotor has a plurality of permanent magnets, of substantially the same length in the circumferential direction, distributed circumferentially about the axis of rotation. A plurality of stator poles are distributed about the air gap, the poles all being of substantially the same length in the circumferential direction as the length of the magnets. The effects of cogging torque on the overall torque signature can be controlled by setting an appropriate air gap variation configuration, designated herein an air gap profile for ease of explanation, for an interfacing stator pole and rotor magnet. The air gap profile is the variation of the radial distance across the air gap between a stator pole shoe and a facing rotor magnet from one end of the pair to the other.

An appropriate air gap profile is dependent upon desired motor operating conditions and motor parameters, such as the number of stator poles and rotor magnets, winding energization sequences and other expected conditions. The profile can be obtained by varying the radial distance from the axis of rotation of either the surface of the rotor magnet or the surface of the stator pole. Either the rotor magnet surface or the stator pole surface may be at a constant radial distance from the axis, while the other surface is of a variable configuration. Alternatively, both the rotor magnet and pole shoe distances may be variable. In the preferred embodiments, the air gap profiles are the same for all interfacing rotor magnet and stator pole combinations. That is, all stator poles are of the same configuration and all rotor magnets are of the same configuration.

One such air gap profile within contemplation of the invention provides a substantially uniform decrease in the radial distance between the interfacing rotor and stator pair from a first end of the pair to the second end. If the rotor permanent magnets are of relatively constant thickness, the stator pole surfaces are sloped relative to the surfaces of the rotor magnets. Alternatively, the permanent magnets may decrease in radial thickness from end to end.

In another air gap profile, the rotor magnet surfaces may be each at a constant radial distance from the axis while stator pole shoes are of variable radial thickness with concave surfaces facing the air gap. The degree of concavity can be set in accordance with whether the rotor surrounds the stator or the stator surrounds the rotor. As a variation, the permanent magnets may be of variable radial thickness with concave surfaces facing the air gap of selected degree of concavity.

The above described pole structures can be provided, with advantageous results, in a stator arrangement having a plurality of separated, ferromagnetically isolated electromagnet core segments. Each segment may be formed of a pole pair, such as shown in FIG. 1. The stator is a single annular ring encompassing a single pole in the axial direction and a plurality of pole pairs in the circumferential direction. In other arrangements, multiple rings of stator poles are axially spaced, formed by a plurality of separated, ferromagnetically isolated, electromagnet core segments. Each of the core segments comprises a plurality of poles integrally joined by one or more linking portions extending generally in the direction of the axis of rotation. The stator thus forms a plurality of poles in the axial direction with a single pole of each segment distributed in the circumferential direction in each ring. In the latter arrangements, the rotor is formed of axially spaced rings of separated magnets disposed circumferentially along the air gap, the number of rotor rings being equal to the number of stator poles in a stator core segment.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which.

DETAILED DESCRIPTION OF THE INVENTION

Figure 1:
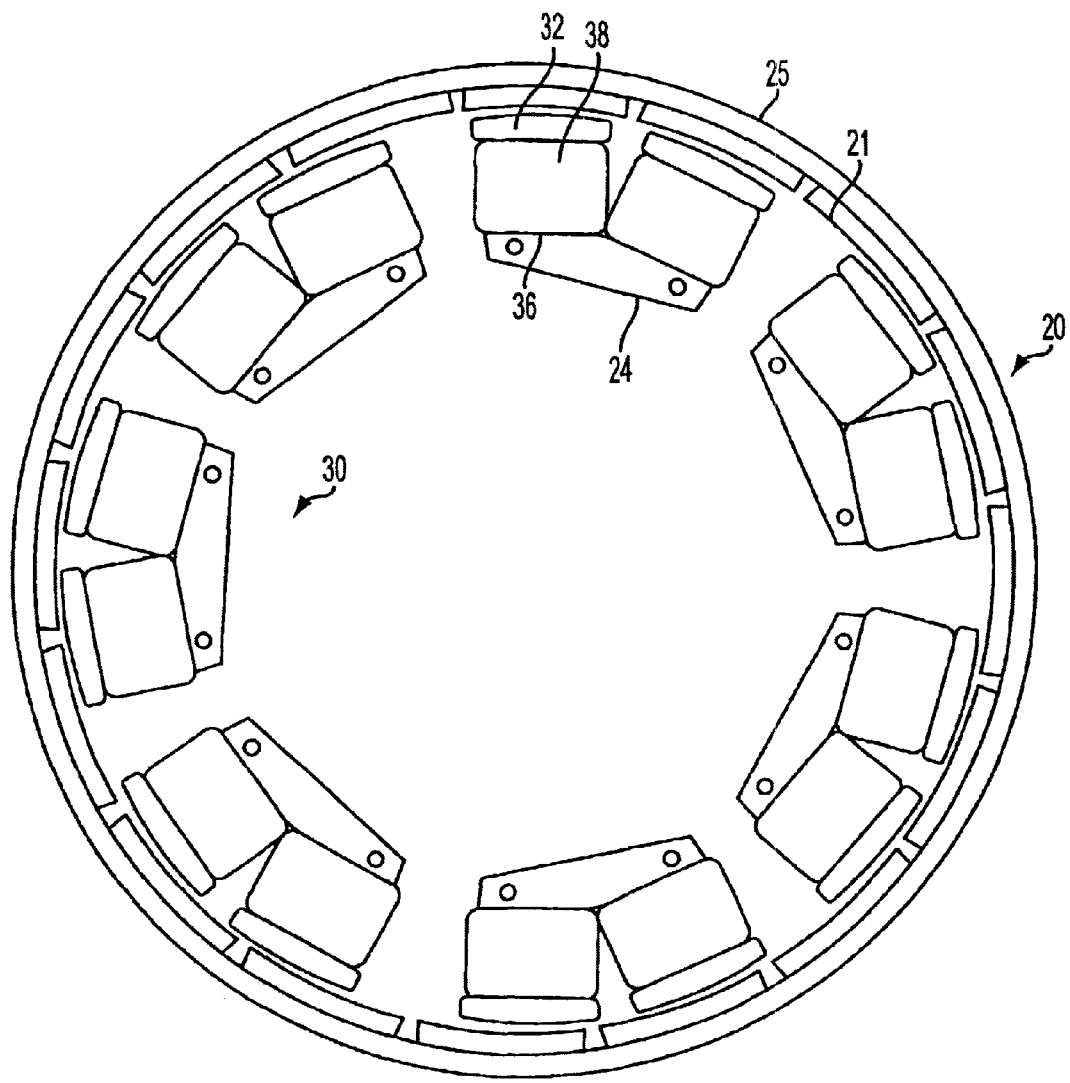
FIG. 1 is an exemplary view showing rotor and stator elements of a motor such as disclosed in the copending application Ser. No. 09/826,422.
Figure 2:
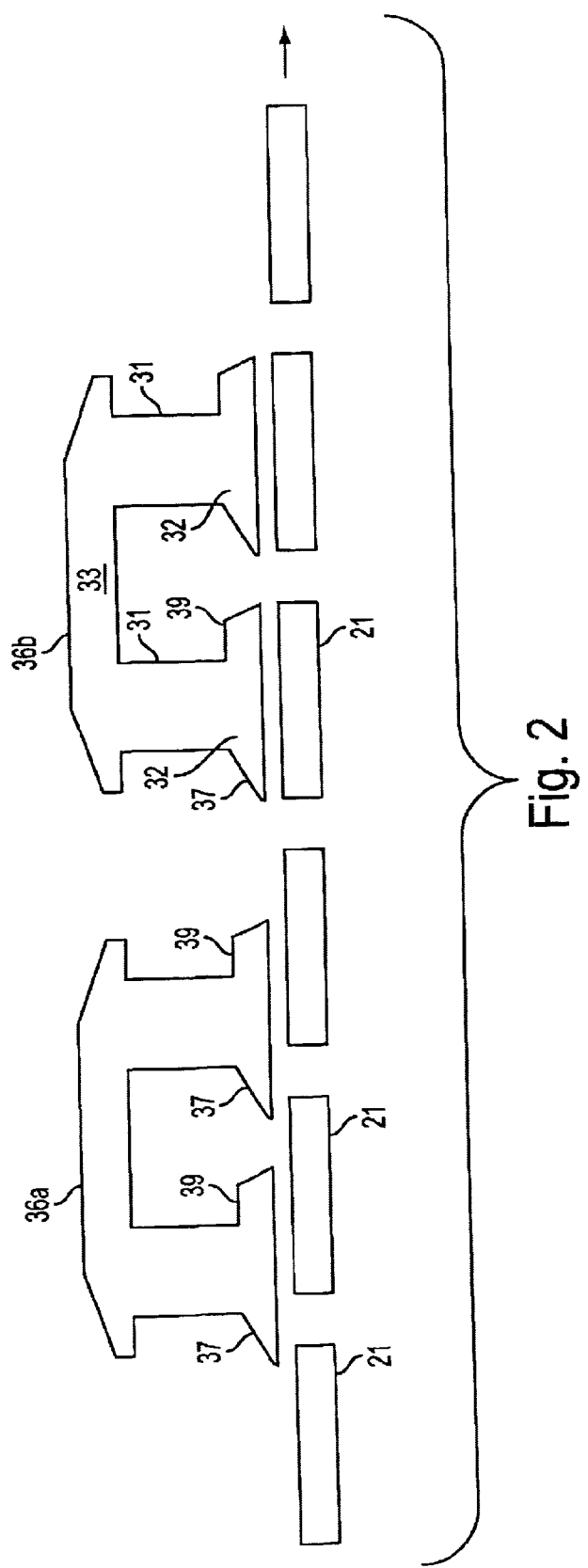
FIG. 2 is diagram of a partial plan layout of a motor such as illustrated in FIG. 1, with stator poles shown in relation to rotor permanent magnet surfaces.
Figure 3:
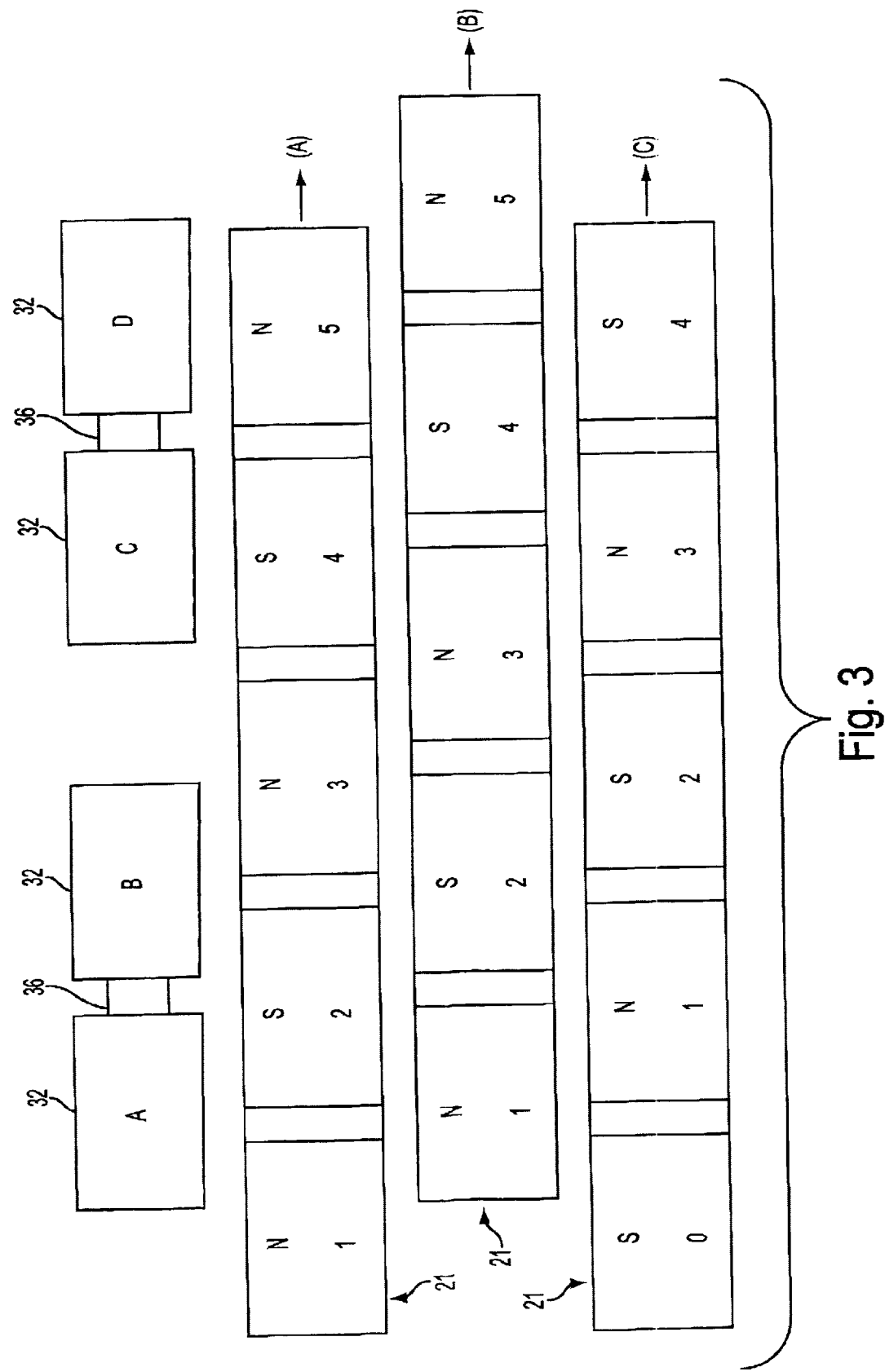
FIG. 3 is a partial plan layout of elements of FIG. 1 illustrating relative positions of stator pole surfaces and rotor surfaces for three instants of time during motor operation.
Figure 4:
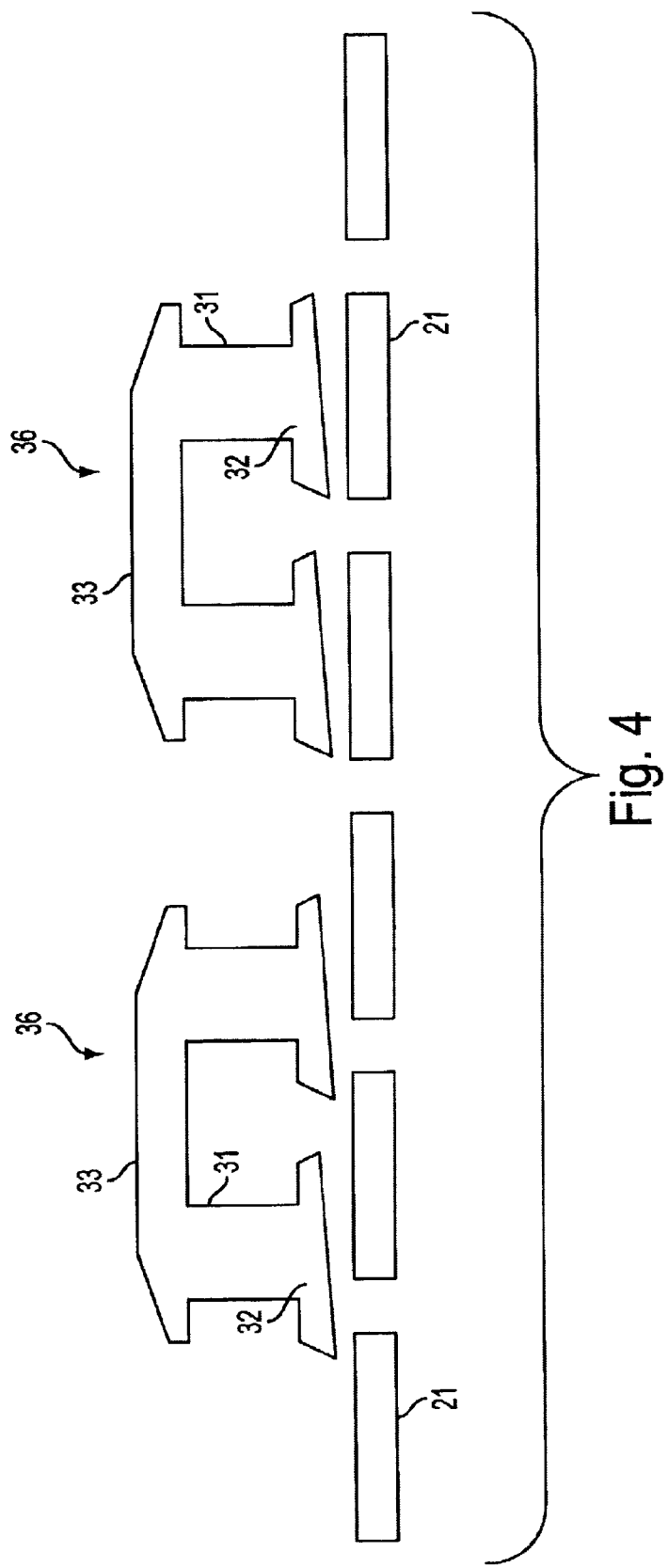
FIG. 4 is diagram of a partial plan layout of stator poles in relation to rotor permanent magnet surfaces in accordance with the present invention.

The concepts of the present invention are applicable to motors having a single set of circumferentially disposed rotor and stator elements concentrically arranged about a radial air gap such as the motor of FIG. 1, described above, as well as to motors having two or more axially spaced sets of rotor and stator elements. FIG. 4 is diagram of a partial plan layout of a motor such as illustrated in FIG. 1, with stator poles modified in accordance with the present invention shown in relation to rotor permanent magnet surfaces. It is to be understood that this layout is representative of a rotary motor with rotor and stator in concentric relationship with each other, separated by a radial air gap. The rotor magnets 21, of successive alternating magnetic polarity, are shown absent supporting structure for clarification of the arrangement. Stator core elements 36 each comprise a pair of poles having base portions 31 and pole shoe portions 32. The poles are integrally linked to each other by linking portion 33. Energization windings, not shown, for each pole pair may be formed in well-known manner on the pole base portions or on the linking portion. Each pole shoe extends outwardly in both circumferential directions from the pole base portion by pole shoe extensions.

The pole shoes of stator core element 36 shown in the right-hand portion of the figure are in positional alignment with rotor magnets 21. The interfacing pole shoes and magnets are substantially the same length along the air gap. The permanent magnets are each of the same radial thickness, the surfaces thereof along the air gap thus being a uniform distance from the rotational axis. In the plan view of the figure, the surfaces of the stator pole faces are sloped with respect to the permanent magnet surfaces at the air gap so that the radial distance in the air gap therebetween increases substantially uniformly from the left end to the right end of the pair. If the rotor sweeps in direction from right to left with respect to the stator during normal motor operation, the leading edge of a rotor magnet overlaps a stator pole face with a decreasing air gap separation. The transitional impact of cogging torque effect is smoothed for the opposing stator and rotor elements, compared to a motor configuration having a constant air gap dimension. If the rotor sweeps in direction from left to right with respect to the stator during normal motor operation, the leading edge of a rotor magnet overlaps a stator pole face with an increasing air gap separation. As the rotor magnet sweeps past the stator pole, the cogging force attraction therebetween becomes progressively less as compared to a constant air gap configuration. Thus, for either rotational direction, the degree of slope of the variable air gap configuration of FIG. 4 can be determined to obtain a desired overall torque signature.

Figure 5:
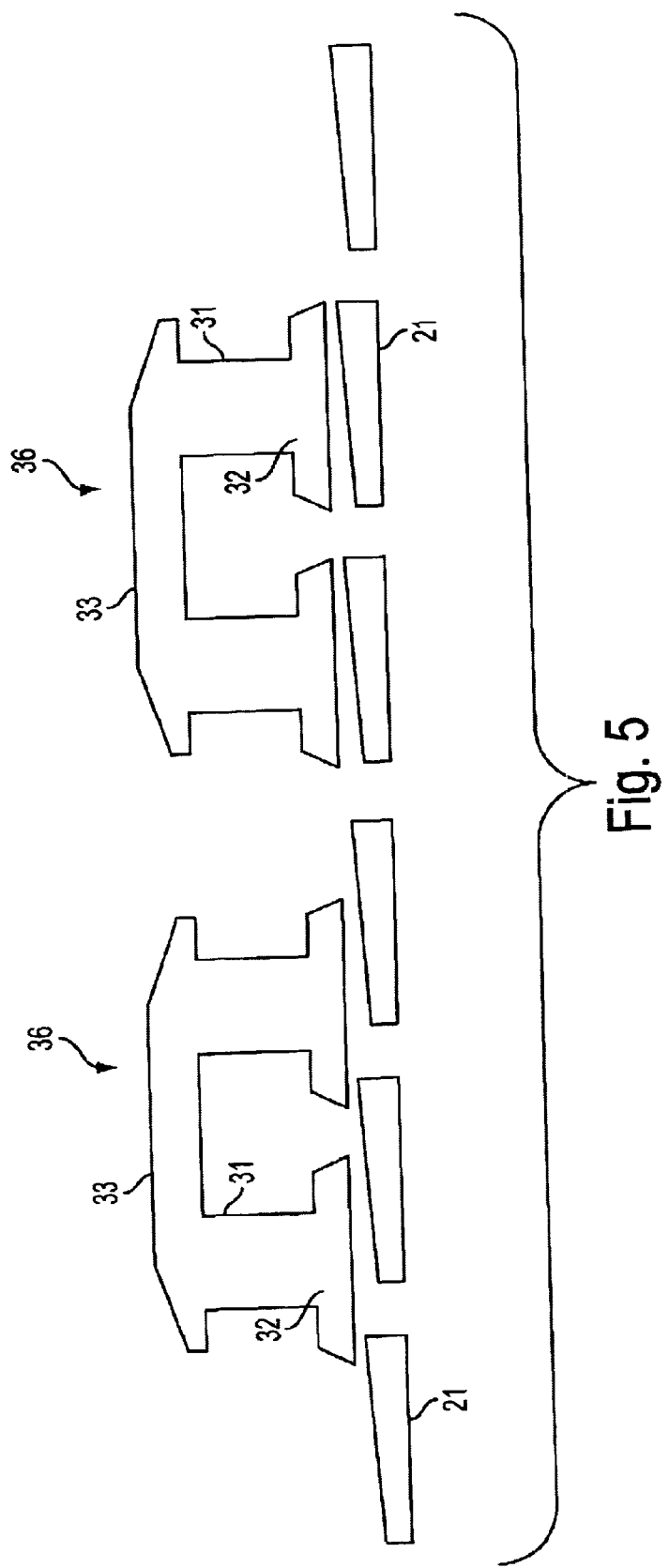
FIG. 5 is diagram of a partial plan layout of stator poles in relation to rotor permanent magnet surfaces in accordance with a variation of the structure of FIG. 4.

FIG. 5 illustrates a variation of the structure of FIG. 4. As shown in the plan view, the stator pole faces lie in a horizontal plane, thus representing uniform distance from the axis of rotation along the air gap circumference. The surfaces of rotor permanent magnets 21 are sloped to provide the same variable air gap effects as described with respect to FIG. 4.

Figure 6:
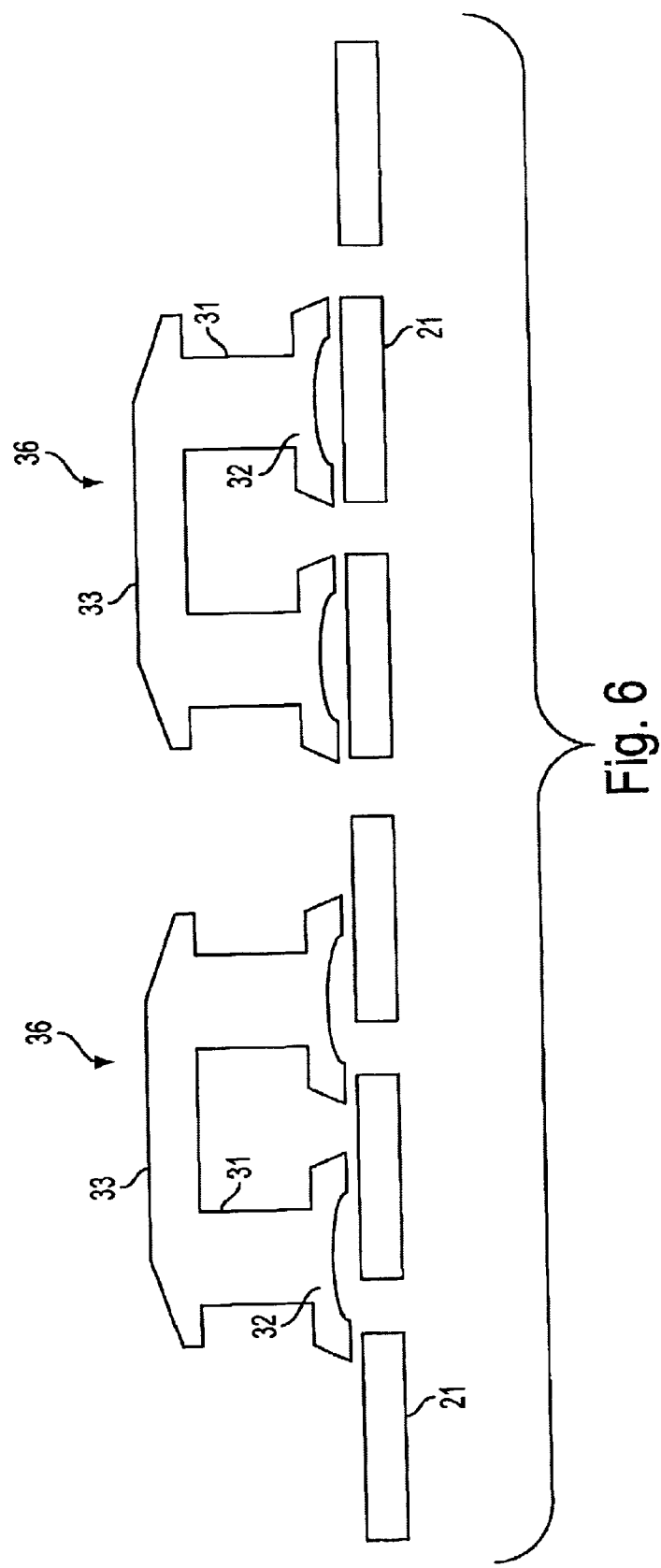
FIG. 6 is diagram of a partial plan layout of stator poles in relation to rotor permanent magnet surfaces in accordance with another variation of the invention.

In the configuration of FIG. 6, the permanent magnets are each of the same radial thickness. As shown in the plan view, the permanent magnet surfaces at the air gap lie in a horizontal plane, representing a uniform distance from the rotational axis along the air gap. The stator pole surfaces are concave relative to the rotor magnet surfaces, the degree of concavity being greater than that required to maintain a uniform distance from the axis of rotation for motors in which the stator surrounds the rotor. Thus, each interfacing pair of stator pole and rotor magnet, for example, those at the right hand portion of the figure, define a variable air gap distance therebetween. As a rotor magnet approaches and sweeps past a stator pole, the effect of this variable air gap on cogging torque differs from that of a uniform air gap configuration by converging the flux distribution in a manner analogous to the convergence of light by a convergent optical lens. The degree of concavity can be adjusted to improve the overall torque signature as desired.

Figure 7:
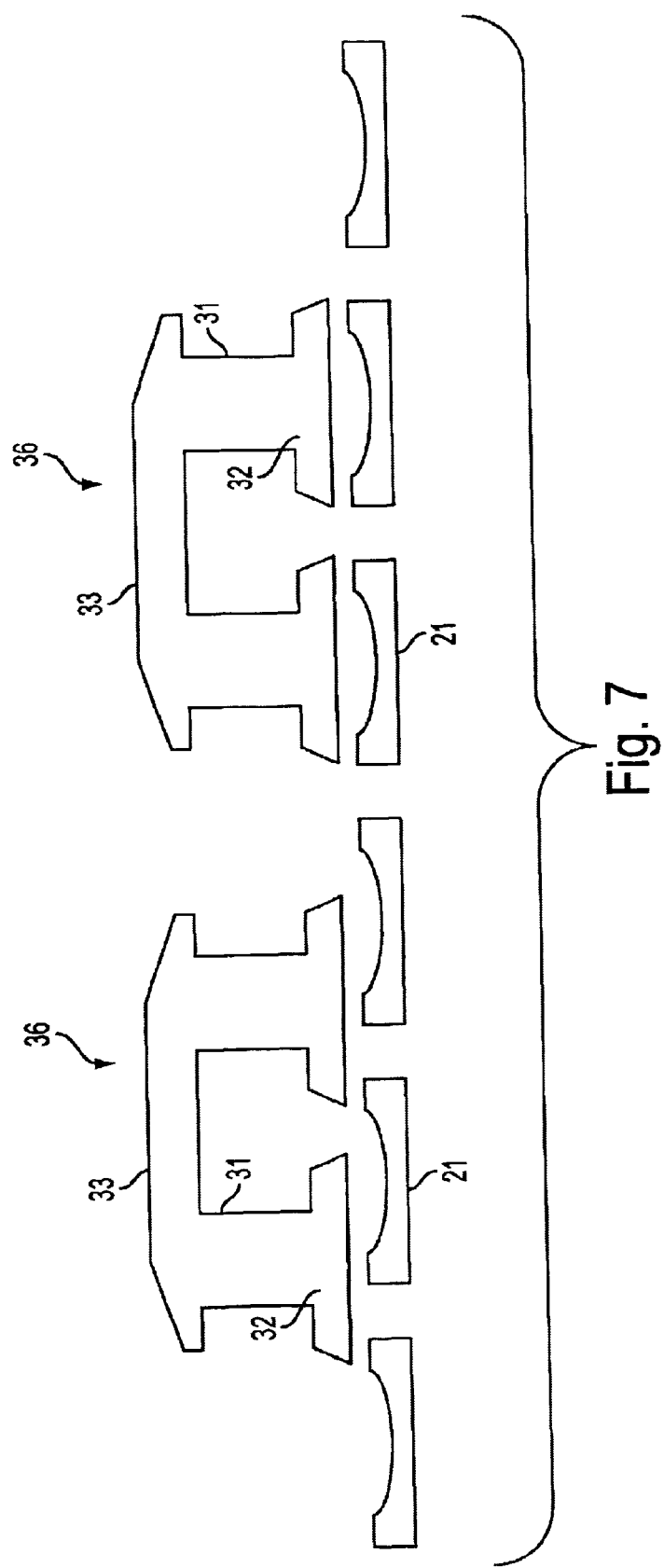
FIG. 7 is diagram of a partial plan layout of stator poles in relation to rotor permanent magnet surfaces in accordance with a variation of the structure of FIG. 6.

FIG. 7 illustrates a variation of the structure of FIG. 6. As shown in the plan view, the stator pole faces lie in a horizontal plane, thus representing uniform distance from the axis of rotation along the air gap circumference. The surfaces of rotor permanent magnets 21 are concave with respect to the magnet surfaces to provide the same variable air gap effects as described with respect to FIG. 6.

The benefits of the stator pole structural variations described above are applicable to other stator/rotor configurations. For example, a stator having an integral continuous stator core may have salient poles formed as described with respect to any of FIGS. 3–7 to provide cogging torque compensation. Such pole formations may be implemented to alleviate cogging torque manifestations in motors having a single axially aligned row of magnets and stator poles.

Figure 8:
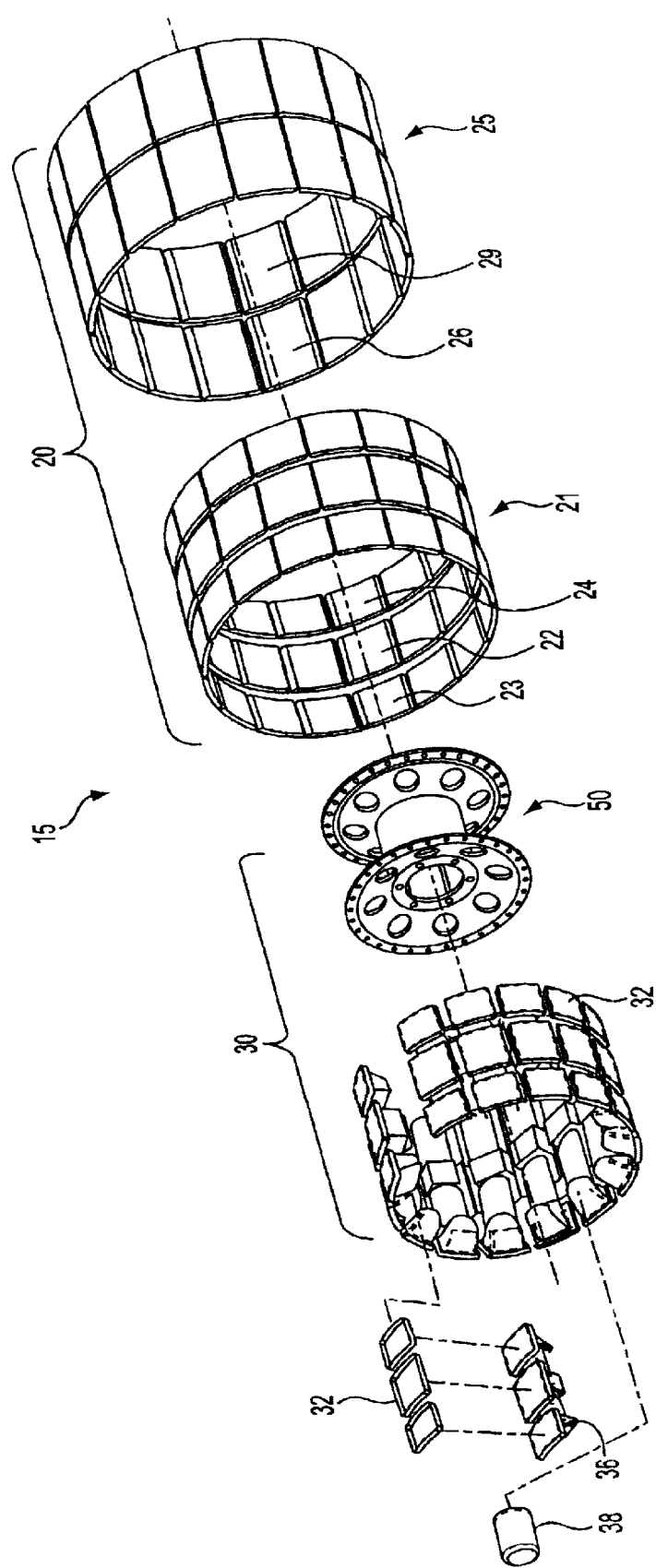
FIG. 8 is a three-dimensional exploded view of a motor having axially aligned stator and rotor elements, such as disclosed in copending application Ser. No. 10/067,305, that may incorporate stator pole structures of FIGS. 3–6.

FIG. 8 illustrates a three-dimensional exploded view of a motor such as disclosed in copending application Ser. No. 10/067,305. Motor 15 comprises annular permanent magnet rotor 20 and annular stator structure 30 separated by a radial air gap. A plurality of ferromagnetically isolated stator core segment elements 36, made of magnetically permeable material, are supported by support structure 50, which maintains ferromagnetic isolation of the segments. Segment 36 is an integral structure formed of a magnetically permeable material with pole surfaces 32 facing the air gap. Each stator core element 36 is an electromagnet including windings 38 formed on the core material. Reversal of the direction of energizing current, in known manner, effects reversal of the magnetic polarities of each of the poles. The rotor comprises a permanent magnet section 21 with three axially spaced rings of rotor magnets 22–24, circumferentially distributed about the air gap, and a back iron ring 25 upon which the permanent magnets are mounted. Stator support structure 50 may be affixed to a stationary shaft, the rotor mounted within a housing that is journalled to the shaft through appropriate bushings and bearings.

The stator poles and rotor magnets shown in FIG. 8 may be constructed as shown in any of the variations of FIGS. 3–7. As a great number of magnets and stator poles are provided in both the circumferential direction and the axial rotation, compensation is provided for a potentially great cogging torque disturbance.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, each of the layouts illustrated in the drawings can be implemented with unitary, instead of segmented, stator cores that are axially spaced from each other, with beneficial results. Also, although the illustrated examples depict the stator pole pitch to be substantially equal to the rotor pole pitch for clarity of explanation, the circumferential distance between a pair of stator poles may be greater or less than the distance between a rotor magnet pair.

While specific geometric configurations of the stator core elements have been illustrated, it should be recognized that the inventive concept herein encompasses a multitude of variations of these configurations as virtually any shape can be formed using the powder metal technology. Thus a specific core configuration can be tailored to the flux distribution desired. For example, it is within the concept of the invention to provide convex or other geometric surfaces and that different sets of pole pairs can have pole shoes respectively with different configurations. A convex configuration would diverge the flux distribution pattern.

Although the description of the present invention depicts the stator surrounded by the rotor, the concepts of the invention are equally applicable to motors in which the rotors are surrounded by stators.

What claimed is:

1. A rotary electric motor comprising a stator and a rotor arranged concentrically about an axis of rotation, the stator and rotor separated by a radial air gap, wherein the rotor comprises a plurality of permanent magnets distributed circumferentially about the axis of rotation, the permanent magnets being of substantially the same length in the circumferential direction;

a stator comprises a plurality of electromagnet core segments distributed about the air gap, the core segments being separated and ferromagnetically isolated from each other, each core segment comprising a plurality of poles being of substantially the same length in the circumferential direction as the length of the magnets; and the radial distance in the air gap between an interfacing pair of rotor permanent magnet and stator pole is variable along the circumferential length of the pair.

2. A rotary electric motor as recited in claim 1, wherein the radial distance in the air gap between said interfacing pair decreases substantially uniformly in the circumferential direction from a first end of the pair to a second end of the pair.

3. A rotary electric motor as recited in claim 2, wherein the permanent magnet of said interfacing pair is of relatively constant radial thickness.

4. A rotary electric motor as recited in claim 2, wherein the permanent magnet of said interfacing pair decreases in radial thickness from the first end to the second end.

5. A rotary electric motor as recited in claim 1, wherein the stator poles comprise poles shoes of variable radial thickness, the pole shoes having concave surfaces facing the air gap.

6. A rotary electric motor as recited in claim 5, wherein the rotor surrounds the stator.

7. A rotary electric motor as recited in claim 1, wherein each permanent magnet varies substantially uniformly in radial thickness in its circumferential extent along the air gap.

8. A rotary electric motor as recited in claim 1, wherein each of the core segments comprises a plurality of poles integrally joined by one or more linking portions the poles extending generally in a direction parallel to the axis of rotation; and the rotor permanent magnets have surfaces facing the air gap and forming axially spaced rings of separated magnets disposed circumferentially along the air gap, the number of said rings being equal to the number of stator poles in a stator core segment.

9. A rotary electric motor as recited in claim 4, wherein the permanent magnet of said interfacing pair decreases substantially uniformly in radial thickness from the first end to the second and.

* * * * *